US012638130B2

(12) United States Patent　　　(10) Patent No.:　US 12,638,130 B2

Fan　　　　　　　　　　　　　　　(45) Date of Patent:　May 26, 2026

(54) FOLDABLE MAGNETIC STAND DEVICE

(71) Applicant: Eagle Fan, Chu-Pei City (TW)

(72) Inventor: Eagle Fan, Chu-Pei City (TW)

( * ) Notice: Subject to any disclaimer, the term of this patent is extended or adjusted under 35 U.S.C. 154(b) by 105 days.

(21) Appl. No.: 18/638,385

(22) Filed: Apr. 17, 2024

(65) Prior Publication Data

US 2025/0137581 A1　　May 1, 2025

(51) Int. Cl.
　　*F16M 13/02*　　(2006.01)
　　*F16M 11/04*　　(2006.01)
　　*F16M 11/12*　　(2006.01)

(52) U.S. Cl.
　　CPC ........ *F16M 13/022* (2013.01); *F16M 11/041* (2013.01); *F16M 11/126* (2013.01)

(58) Field of Classification Search
　　CPC ... F16M 13/022; F16M 11/041; F16M 11/126
　　See application file for complete search history.

(56) References Cited

U.S. PATENT DOCUMENTS

| | | | |
|---|---|---|---|
| 9,577,467 B1 * | 2/2017 | Karanikos | H02J 50/005 |
| 9,800,283 B2 * | 10/2017 | Schmidt | A45C 13/1069 |
| 10,253,926 B1 * | 4/2019 | Fan | F21V 21/096 |
| 10,272,847 B1 * | 4/2019 | Fan | B60N 3/004 |
| 10,836,326 B1 * | 11/2020 | Yang | H04B 1/3877 |
| 10,948,124 B2 * | 3/2021 | Xiang | H02J 50/10 |

| | | | |
|---|---|---|---|
| 11,473,601 B2 * | 10/2022 | Fan | F16M 11/2064 |
| 11,563,838 B1 * | 1/2023 | Sham | H04M 1/0202 |
| 12,081,035 B2 * | 9/2024 | Haug | H02J 50/70 |
| 12,088,752 B1 * | 9/2024 | Liu | H04M 1/04 |
| 12,279,394 B2 * | 4/2025 | Cai | G06F 1/1626 |
| 2020/0377037 A1 * | 12/2020 | Yang | H04B 1/3877 |
| 2021/0324994 A1 * | 10/2021 | Liu | F16M 11/38 |
| 2022/0228709 A1 * | 7/2022 | Chao | F16M 11/40 |
| 2023/0128108 A1 * | 4/2023 | Wang | A45F 5/1516 |
| | | | 294/142 |
| 2025/0020273 A1 * | 1/2025 | Fan | A47G 29/087 |

FOREIGN PATENT DOCUMENTS

| | | | | |
|---|---|---|---|---|
| CN | 213585887 U | * | 6/2021 | |
| CN | 216565239 U | * | 5/2022 | |

* cited by examiner

*Primary Examiner* — Monica E Millner

(74) *Attorney, Agent, or Firm* — John D. Tran; Rhema Law Group, P.C.

(57)　　　　　ABSTRACT

A foldable magnetic stand device and method of manufacture is provided, comprising: a magnetic base for fixing a mobile phone by magnetic attraction; a first support unit coupled to the magnetic base; a first pivot unit coupled to the first support unit providing a first axis of rotation for the magnetic base; a second pivot unit coupled to the first pivot unit, the second pivot unit providing a second axis of rotation, and the first pivot unit rotates about the second axis of rotation; and a second support unit pivotally connected to the second pivot unit, and an angle and orientation between the first support unit and the second support unit being adjustable through adjusting the first pivot unit and the second pivot unit.

18 Claims, 9 Drawing Sheets

FOLDABLE MAGNETIC STAND DEVICE

TECHNICAL FIELD

The present invention relates generally to a technical field of stand device for mobile phone, and more particularly, to a convenient hand-free device for mobile phone.

BACKGROUND

Mobile phones magnetically fixable are now very common. Generally, mobile phones with wireless charging function provide such a feature, but some users will also directly paste a thin metal sheet on the surface of the mobile phone so that various magnetic holders can hold mobile phones magnetically, allowing users to use mobile phones more conveniently in a hands-free manner. However, the general mobile phone holder is bulky and difficult to fold, so it is inconvenient to carry and use. Therefore, the inventor hopes to design a foldable structure that can magnetically fix a mobile phone. After folding, the size of the structure must be reduced. Moreover, the structure can be adjusted to a variety of angles and shapes during use, to satisfy the needs of users for use in various places, thus improving the convenience.

SUMMARY

A primary objective of the present invention is to provide a foldable magnetic stand device, which can magnetically fix a mobile phone with a magnetic base, and uses an adjustment mechanism comprising a plurality sets of pivot structures to allow the fixed mobile phone to be adjusted to a plurality of different hands-free modes to meet the needs of users. The hands-free modes include: direct placement on the table and tilted, to be held for taking selfies from a distance, or it can be clamped to a plate. The foldable structure is small in size when folded and easy to carry, while convenient to use when unfolded.

In order to achieve the aforementioned objective, the present invention provides a foldable magnetic stand device, comprising: a magnetic base, provided with a magnetic area and a supporting base respectively located on opposite sides of the magnetic base, a magnet being provided at a position of the magnetic area located inside the magnetic base, the magnetic base fixing a mobile phone by magnetic attraction; a first support unit, for the magnetic base to be rotatably disposed at the first support unit; a first pivot unit, coupling to the first support unit and located at a position away from the magnetic base, a first extension member being provided protrudingly at a middle position of the first pivot unit; a second pivot unit, a second extension member being provided protrudingly at a middle position of the second pivot unit, the first extension member and the second extension member being butted with each other and able to rotate around a same axis; and a second support unit, pivotally connected to the second pivot unit on one side, and an angle and orientation between the first support unit and the second support unit being adjustable through adjusting the first pivot unit and the second pivot unit.

In a preferred embodiment, the magnetic base rotates in a direction perpendicular to the first support unit.

In a preferred embodiment, the first support unit is connected to an outer wall of the magnetic base with a carrier base, and the magnetic base can rotate at the carrier base; a positioning bump is disposed on the outer wall of the magnetic base, and the carrier base has a positioning groove at a corresponding positioning; when the magnetic base rotates on the carrier base until the positioning bump is located in the positioning groove, the relative positions of the first support unit and the magnetic base are fixed.

In a preferred embodiment, the magnetic base is provided with an accommodating groove for the magnet to be placed in, and is also provided with a covering sheet adhered to the magnetic base for sealing the accommodating groove, and an exposed flat area of the covering sheet is the magnetic area.

In a preferred embodiment, the supporting base is surrounded by a ring-shaped wall to form an accommodating area, and the accommodating area can accommodate a magnetic wireless charging head.

In a preferred embodiment, the ring-shaped wall comprises a main body and at least one auxiliary wall with a height higher than the main body of the ring-shaped wall, and an inner wall of the auxiliary wall has raised strips.

In a preferred embodiment, a side of the second support unit away from the second pivot unit is provided with a clamping unit, the clamping unit comprises a fixed clamping member and a movable clamping member, the fixed clamping member is located on the side of the second support unit away from the pivot joint; the movable clamping member is L-shaped, partially extends into the second support unit and can move linearly away from the fixed clamping member.

In a preferred embodiment, the clamping unit also includes an elastic body, the elastic body is located in the second support unit and contacts the movable clamping member, and the elastic body provides the movable clamping member and the fixed clamping member with a clamping force.

In a preferred embodiment, the second support unit is further provided with a guiding groove and a pulling member; the guiding groove is provided with the second support unit, and the pulling member is connected to the movable clamping member inside the second support unit from outside through the guiding groove, and when the pulling member is pulled, the movable clamping member will move synchronously.

Compared with the known technology, the foldable magnetic stand device of the present invention uses the magnetic base to fix the mobile phone regardless of whether the phone is during charging or not. The adjustment structure formed by the first support unit, the first pivot unit, the second pivot unit, and the second support unit is not only small in size and easy to carry when folded, but also can provide more stability to the fixed mobile phone when unfolded and in hands-free usage mode.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION

The technical solutions of the present invention will be described clearly and completely below in conjunction with the specific embodiments and the accompanying drawings. It should be noted that when an element is referred to as being "mounted or fixed to" another element, it means that the element can be directly on the other element or an intervening element may also be present. When an element is referred to as being "connected" to another element, it means that the element can be directly connected to the other element or intervening elements may also be present. In the illustrated embodiment, the directions indicated up, down, left, right, front and back, etc. are relative, and are used to explain that the structures and movements of the various components in this case are relative. These representations are appropriate when the components are in the positions shown in the figures. However, if the description of the positions of elements changes, it is believed that these representations will change accordingly.

Unless otherwise defined, all technical and scientific terms used herein have the same meaning as commonly understood by one of ordinary skill in the art of the present invention. The terminology used herein is for the purpose of describing particular embodiments only and is not intended to limit the present invention. As used herein, the term "and/or" includes any and all combinations of one or more of the associated listed items.

Figure 1:
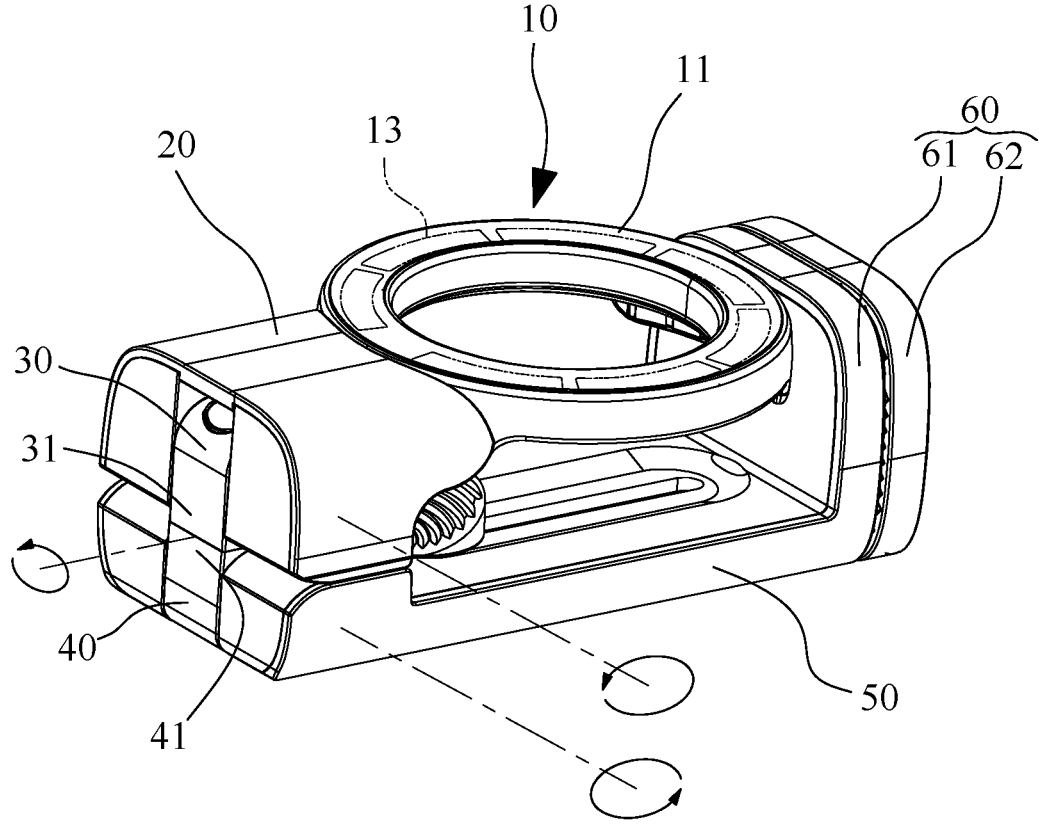
FIG. 1 is a perspective view of the folded state of the present invention.
Figure 2:
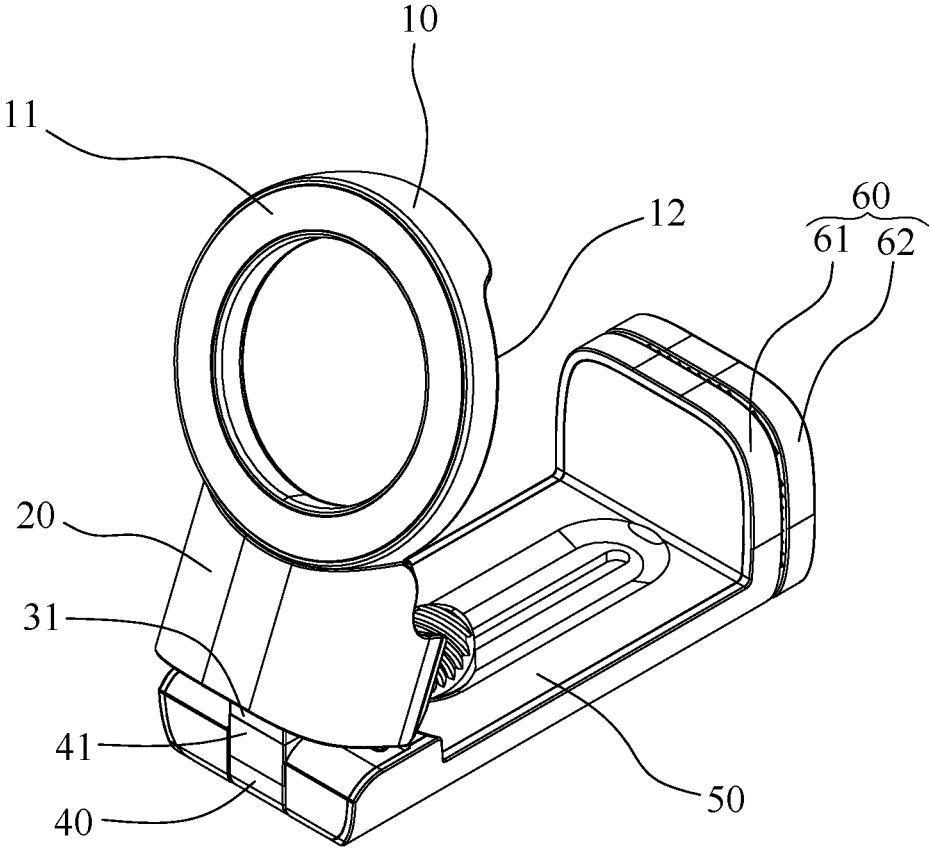
FIG. 2 is a perspective view of the first unfolded usage mode of the present invention.
Figure 3:
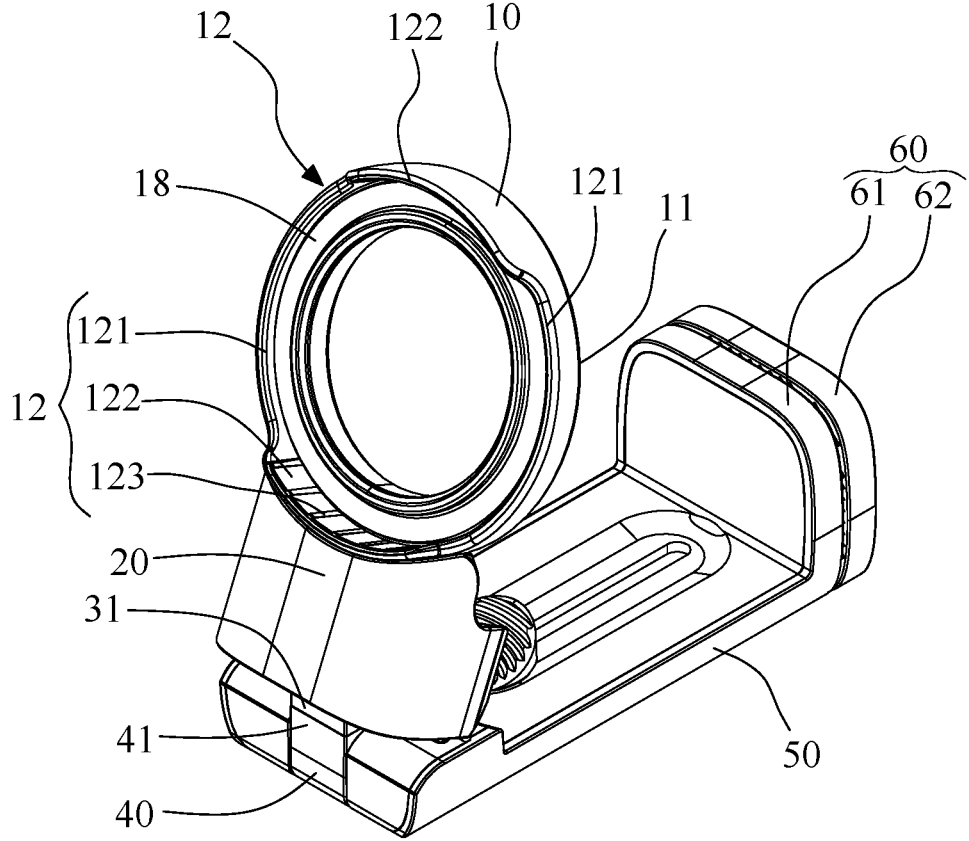
FIG. 3 is a perspective view of the second unfolded usage mode of the present invention.

As shown in FIG. 1, a three-dimensional schematic view of the foldable magnetic stand device of the present invention is in a folded state. The foldable magnetic stand device of the present invention includes a magnetic base 10, a first support unit 20, a first pivot unit 30, a second pivot unit 40, and a second support unit 50. The magnetic base 10 is provided with a magnetic area 11 and a supporting base 12. The magnetic base 11 and the supporting base 12 are respectively located on opposite sides of the magnetic base 10. A magnet 13 is provided at the position of the magnetic area 11 inside the interior of the magnetic base 10. In FIG. 1, the position of the magnet 13 is depicted imaginarily, while in FIG. 4, the actual shape is shown. As such, the magnetic base 10 can magnetically fix a mobile phone. The magnetic base 10 is rotatably installed on the first support unit 20. In FIG. 2, the magnetic area 11 faces outward. In FIG. 3, the magnetic base 10 is rotated by 180 degrees, so that the supporting base 12 is facing outward. The supporting base 12 is used to install a magnetic wireless charging head. During use, the magnetic wireless charging head is used to magnetically fix the mobile phone, and then the mobile phone can be charged by connecting to a power supply. The first pivot unit 30 is pivoted to the first support unit 20 and is located away from the magnetic base 10. The first pivot unit 30 has a protruding first extension member 31 at a middle position. The second pivot unit 40 has a protruding second extension member 41 in a middle position. The second extension member 41 and the first extension member 31 are butt-jointed and both can rotate along the same axis. The second pivot unit 40 is pivotally connected to one side of the second support unit 50. The second support unit 50 is a long and narrow structure. By utilizing the structural characteristics of the first pivot unit 30 and the second pivot unit 40, not only can the angle between the first support unit 20 and the second support unit 50 be adjusted, but the relative position between the two also can be changed, thereby providing a variety of hands-free modes for using the mobile with phone fixed to the magnetic base 10.

Figure 4:
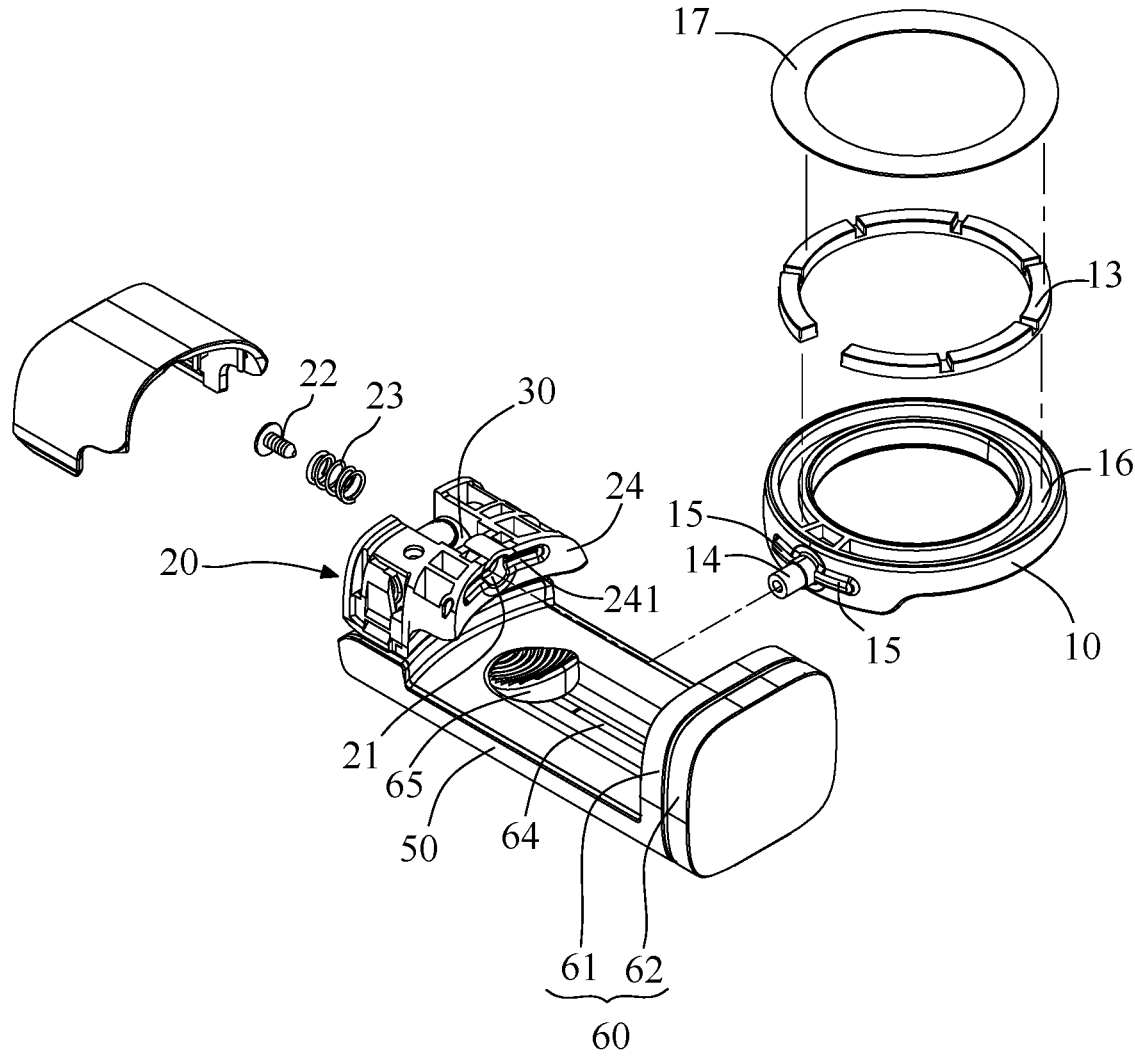
FIG. 4 is an exploded view of the first support unit and the magnetic base of the present invention.

The following provides a brief description of each component. As shown in FIGS. 2 and 3, the magnetic base 10 is rotatably installed on the first support unit 20, and the rotation direction is perpendicular to the first support unit 20, so as to switch the magnetic area 11 or the supporting base 12 to face outward. Therefore, the magnetic base 10 and the first support unit 20 are provided with a positioning mechanism to fix the switching position. FIG. 4 is an exploded view of the magnetic base. A shaft 14 protruding from an outer wall of the magnetic base 10 is installed in a shaft hole 21 of the first support unit 20 and is fastened to the shaft 14 with a screw 22. A spring 23 is clamped on the periphery of the shaft 14, so that the magnetic base 10 can not only rotate at the shaft hole 21, but also move axially for a short distance without breaking away from the shaft hole 21. The first support unit 20 is connected to the outer wall of the magnetic base 10 with a carrier base 24.

A positioning bump 15 is disposed on the outer wall of the magnetic base 10 adjacent to the shaft 14, and the carrier base 24 has a positioning groove at a corresponding positioning. When an external force greater than the spring 23 is applied to the magnetic base 10, the magnetic base 10 can be rotated and axially moved in a short distance. When the magnetic base rotates on the carrier base until the positioning bump 15 is located in the positioning groove 241, the relative positions of the first support unit 20 and the magnetic base 10 are fixed. FIG. 2 shows a usage mode that the magnetic area 11 facing outward, and FIG. 3 shows a usage mode that the supporting base 12 facing outward.

In the present embodiment, the main body of the magnetic base 10 is ring-shaped and has two opposite sides. The magnetic area 11 and the supporting base 12 are respectively provided on opposite sides. The magnetic area 11 is a flat surface, and a magnet 13 is provided inside the magnetic base 10 at the location of the magnetic area 11 so that the magnetic area 11 has a magnetic attraction force. Refer to FIG. 4, the structure of magnetic area 11 is to form an accommodating groove 16 in the ring-shaped structure of the magnetic base 10. The accommodating groove 16 is for the magnet 13 to be placed therein. In addition, a covering sheet 17 is provided. The covering sheet 17 can be a soft pad or a thin pad, the covering sheet 17 is adhered to the magnetic base 10 and seals the accommodating groove 16. The exposed flat area of the covering sheet 17 is the magnetic area 11, as shown in FIG. 1. As such, the magnetic area 11 provides a magnetic attraction force. As shown in FIG. 3, the supporting base 12 is surrounded by a ring-shaped wall 121 to form an accommodating area 18. The accommodating area 18 can accommodate a magnetic wireless charging head. In addition, the ring-shaped wall 121 has a main body and two sets of auxiliary walls 122 that are higher than the main body of the ring-shaped wall 121. The inner wall of the auxiliary walls 122 has raised strips 123. The auxiliary walls 122 is elastic to provide a slight deformation, thereby increasing the final solidity after the magnetic wireless charging head is placed in the accommodating area 18.

The first support unit 20 is a multi-piece structure. One side forms an arc-shaped carrier base 24 for installing the magnetic base 1, and the other side structure is used to pivot the first pivot unit 30, the first support unit 20 can rotate according to a pivot shaft of the first pivot unit 30 to adjust the inclination angle of the first support unit 20.

Figure 5:
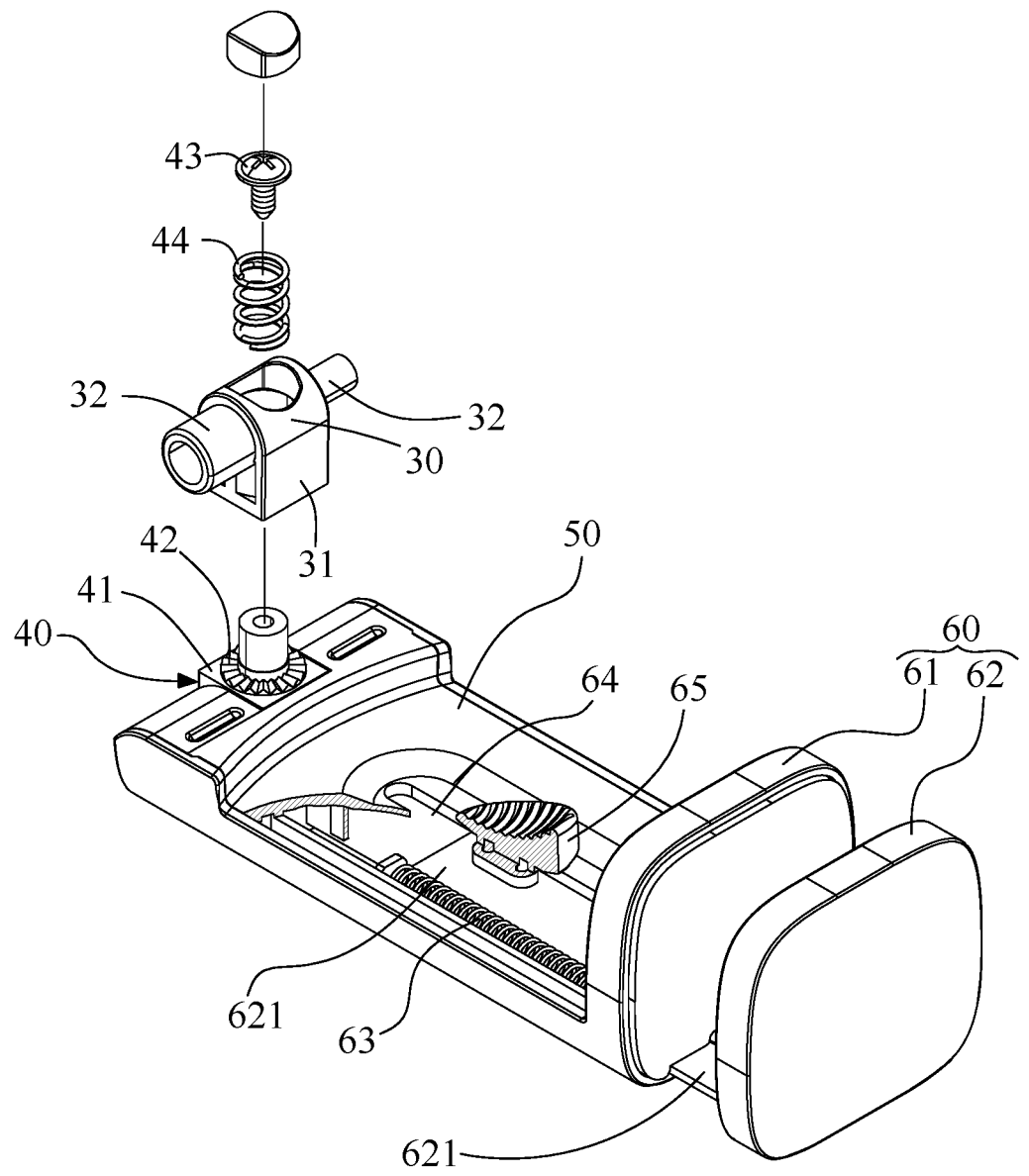
FIG. 5 is a partial cross-sectional schematic view of the first pivot unit, the second pivot unit, and the second support unit of the present invention.

Refer to FIG. 5. The first pivot unit 30 is a T-shaped pivot body. The pivot shafts 32 extending from both sides are pivotally connected to the first support unit 20 so that the two can perform relative rotation. The first pivot unit 30 has a protruding first extension member 31 in the middle. The second pivot unit 40 is also a T-shaped pivot body. The pivot shafts extending on both sides are connected to the second support unit 50 so that the two can rotate relatively to each other. The second pivot unit 40 also has a protruding second extension member 41 at the middle position. The second extension member 41 is butted with the first extension member 31 and both can rotate around the same axis. As such, the first pivot unit 30 provides a specific axial rotation angle of the first support unit 20. The second pivot unit 40 provides a specific axial rotation angle of the second support unit 50. In addition, the first extension member 31 and the second extension member 41 can rotate relatively to each other along the same central axis. Therefore, the relative position of the first support unit 20 and the second support unit 50 can be adjusted for nearly 360 degrees to satisfy the user's needs.

In the present embodiment, the various pivot positions, including the pivot joint between the first support unit 20 and the first pivot unit 30, the butt-joint between the first extension member 31 and the second extension member 41, and the pivot joint between the second pivot unit 40 and the second support unit 50, are all provided with a rotation positioning mechanism, and the rotation positioning mechanism maintains the relative position of the two components after adjustment through tooth surface engagement. As shown in FIG. 5, the rotation positioning mechanism at the joint between the first extension member 31 and the second extension member 41 is shown. The mechanism here includes a tooth surface 42, a screw 43, and a spring 44. The corresponding surface of the first extension member 31 is also provided with a tooth surface (not shown in the figure), so that the two can rotate; and after rotation, the tooth surface is used to position each other. Since this mechanism is similar to the conventional one, it will not be described in detail.

Moreover, in addition to the side of the second support unit 50 for pivotally connecting the second pivot unit 40, in the present invention, the side of the second support unit 50 away from the pivot joint is also provided with a clamping unit 60. The clamping unit 60 is used for clamping on a plate-shaped object, thereby providing various usage modes. As shown in FIG. 5, the clamping unit 60 includes a fixed clamping member 61 and a movable clamping member 62, the fixed clamping member 61 is located on the side of the second support unit 50 away from the pivot joint. The movable clamping member 62 is L-shaped, partially extends into the second support unit 50 and can move linearly away from the fixed clamping member 61. The clamping unit 60 provides the function of clamping by the fixed clamping member 61 and the movable clamping member 62, and there are many ways to drive the movement of the movable clamping member 62, such as driving the movable clamping member 62 by rotating a screw. However, the present invention adopts a simpler method. In the present embodiment, the clamping unit 60 also includes an clastic body 63, and the elastic body 63 is a spring. The clastic body 63 is located in the second support unit 50 and contacts the movable clamping member 62. The clastic body 63 maintains the tightness of the clamping. When there is no external force, the clastic body 63 is responsible for driving the movable clamping member 62 to move into a state of contact with the fixed clamping member 61. In addition, the main structure of the movable clamping member 62 is an L-shaped metal piece 621. Since the structures entering the second support unit 50 are all made of metal, it can not only maintain better rigidity but also have an appropriate weight. As such, when using the second support unit 50 as a base, the stability when placed on the desktop is improved.

In addition, for the convenience of operation, the clamping unit 60 is also provided with a guiding groove 64 and a pulling member 65. The guiding groove 64 is located in the second support unit 50 and the top surface penetrates the wall. The pulling member 65 is partially combined with the metal piece 621 of the movable clamping member 62 located in the second support unit 50 through the guiding groove 64. When the pulling member 65 is pulled, the movable clamping member 62 can move synchronously, thereby, allowing the operator to easily push the movable clamping member 62 to facilitate clamping on the plate-shaped object by the movable clamping member 62 and the fixed clamping member 61.

Figure 6:
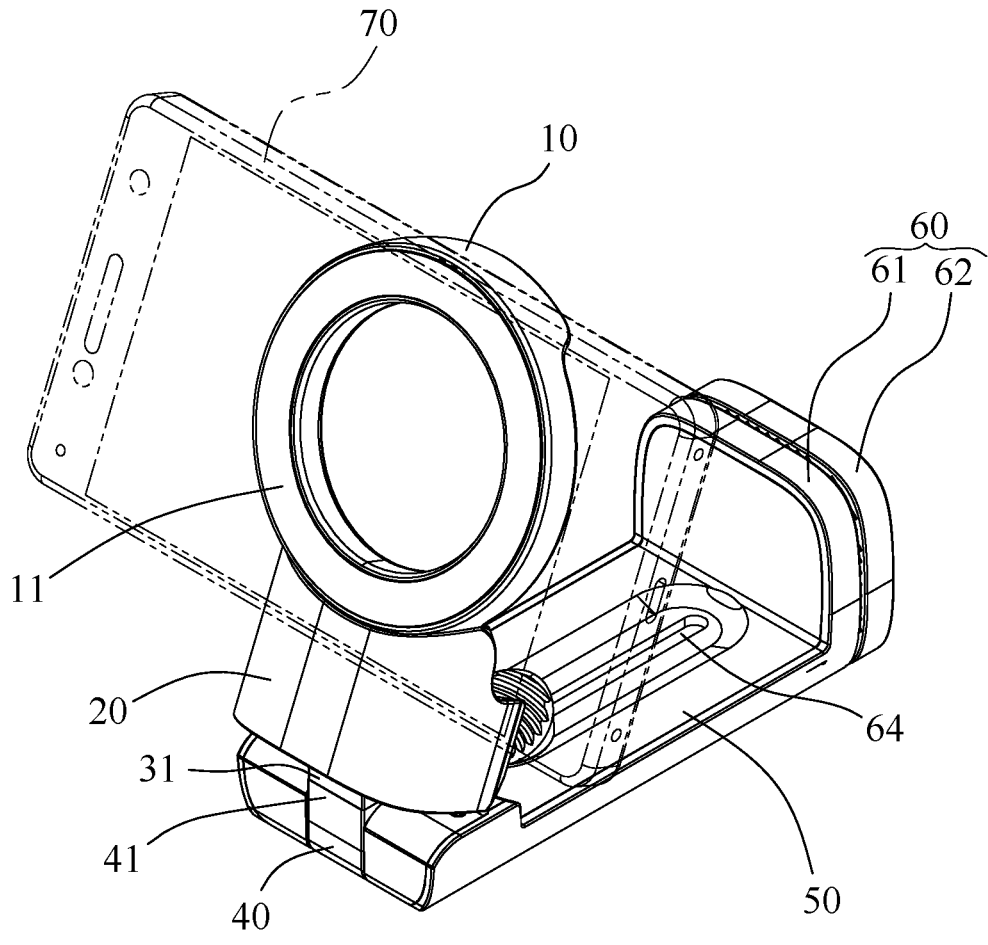
FIG. 6 is a schematic view of fixing a mobile phone in the present invention.
Figure 7:
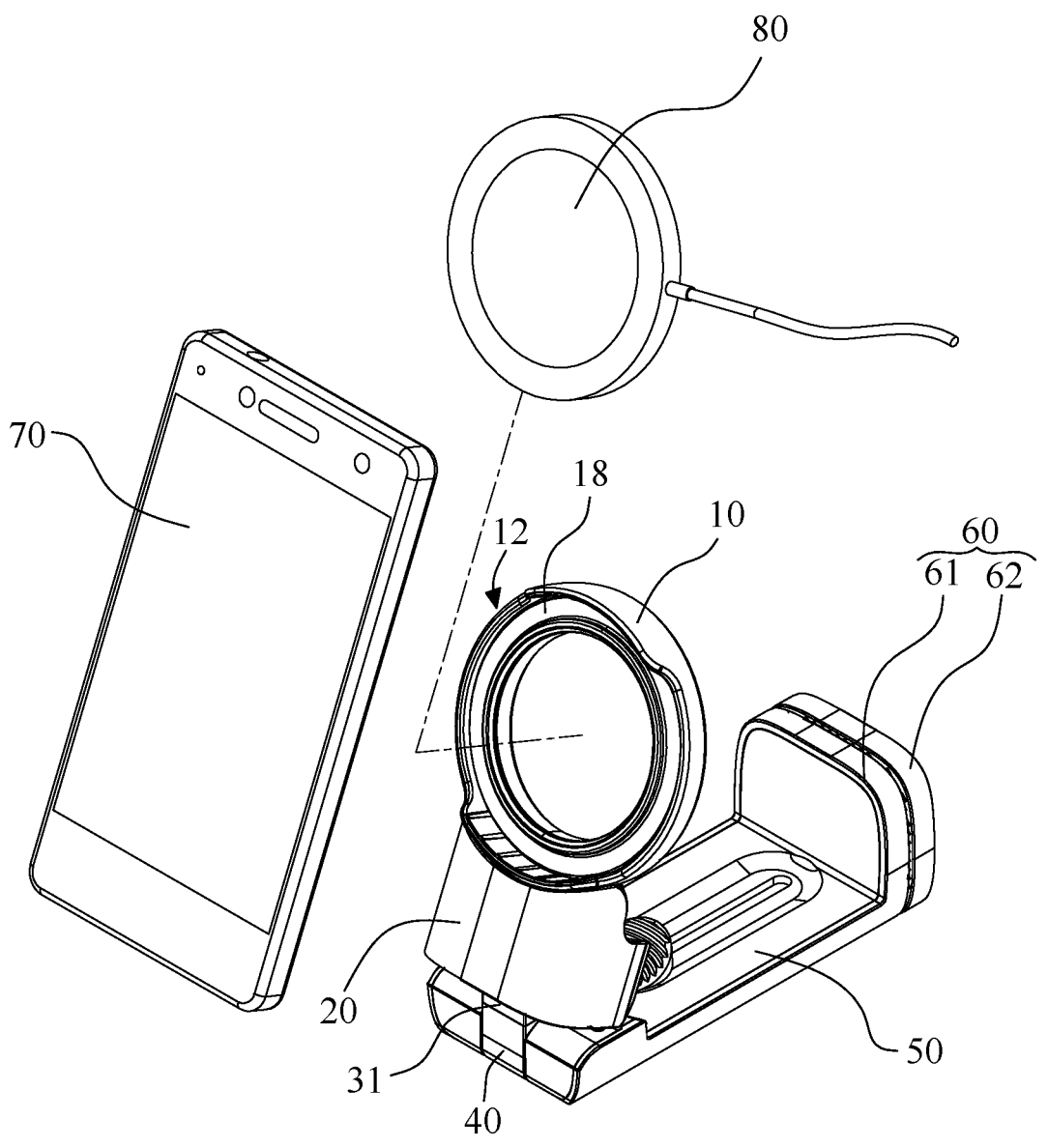
FIG. 7 is a schematic view of the present invention using a magnetic wireless charging induction head to fix a mobile phone.

Next, a description will be given of the usage mode of various hands-free mobile phones of the present invention:

As shown in FIG. 6, the second support unit 50 does not clamp any object. The second support unit 50 is placed on the desktop as a base. Because the movable clamping member 62 is partially made of metal, it provides a considerable weight which is more stable. Then, the first support unit 20 is rotated with respect to the first pivot unit 30 so that the first support unit 20 is in an inclined state, and then the magnetic area 11 of the magnetic base 10 is used to directly magnetically fix a mobile phone 70. Due to the magnetic fixation, the mobile phone 70 can be easily adjusted to vertical or horizontal use according to the user's needs. FIG. 7 shows another usage mode of the present invention. If a user wants to use a mobile phone while charging, the user can first rotate the magnetic base 10 for 180 degrees, and then install a magnetic wireless charging head 80 on the supporting base 12 at the accommodation area 18. The magnetic wireless charging head 80 magnetically attracts the mobile phone 70, so that the mobile phone 70 can be used in an upright position on the desktop. In addition, the mobile phone 70 can also be adjusted to a horizontal use mode by rotating.

Figure 8:
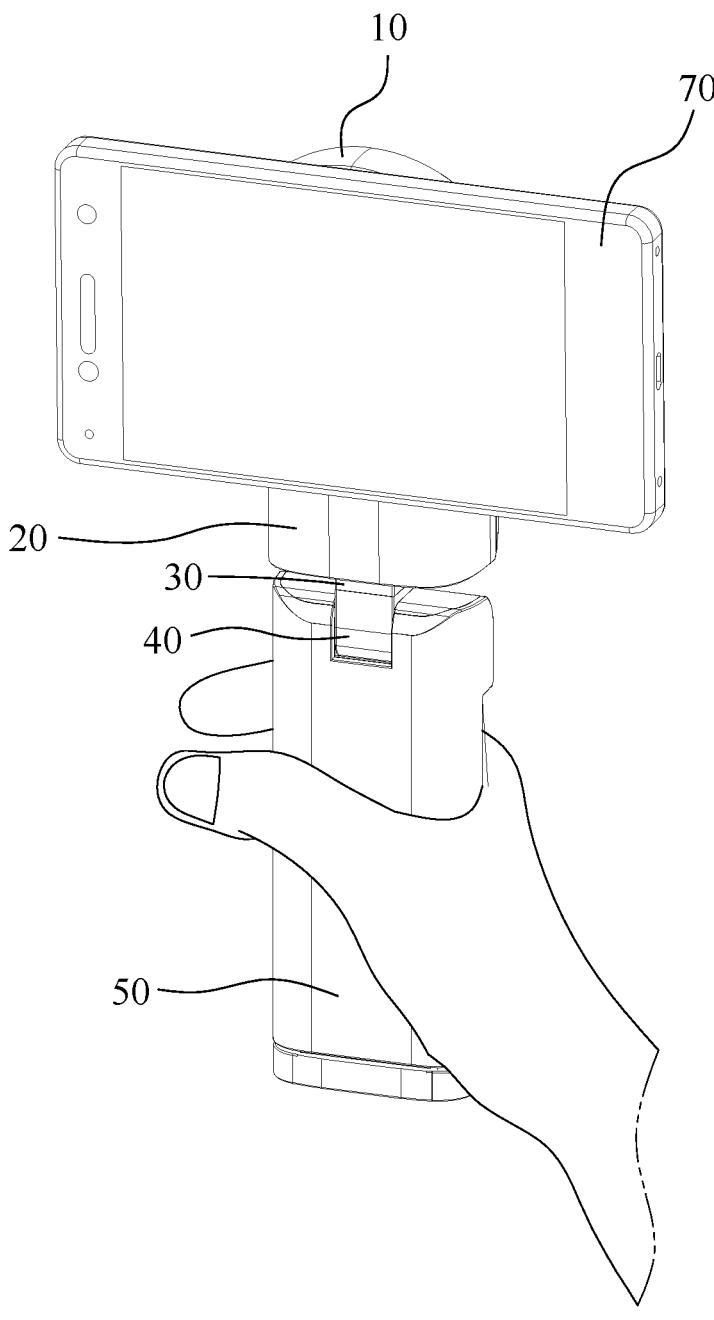
FIG. 8 is a schematic view of hand holding the present invention to take a selfie with a mobile phone.

As shown in FIG. 8, for a hands-free selfie mode, adjust the first pivot unit 30 and the second pivot unit 40 so that the first support unit 20 and the second support unit 50 remain aligned. The second support unit 50 is held in a linear shape, and the magnetic base 10 magnetically attracts the mobile phone 70, so that one can conveniently take selfies with the mobile phone 70. Of course, the first support unit 20 can also be adjusted to different tilt angles for convenience to take selfies from the best angle.

Figure 9:
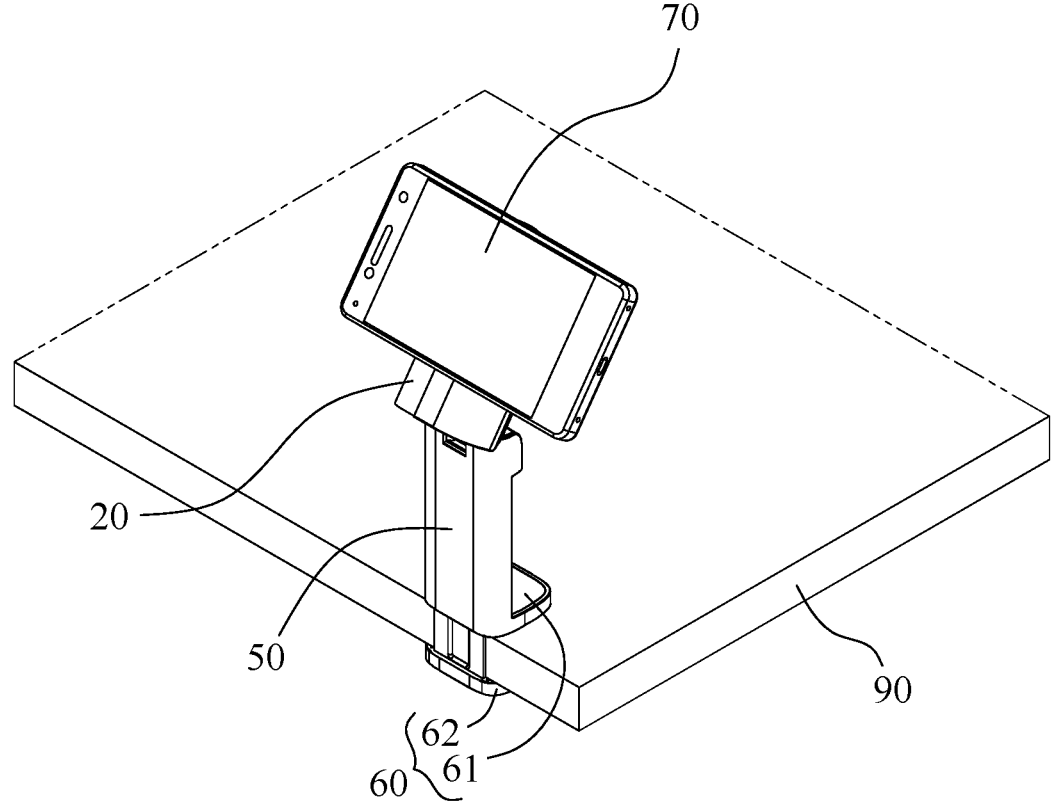
FIG. 9 is a schematic view of the usage mode of the present invention clamped on a plate-shaped object.

As shown in FIG. 9, the clamping unit 60 is used to clamp a plate-shaped object 90. The plate-shaped object 90 can be a table, or a dining plate on the back of the seat in an airplane, a high-speed rail, a train, or other mass transportation system. The clamping unit 60 clamps the plate 90 with the movable clamping member 62 and the fixed clamping member 61, and adjusts the first pivot unit 30 and the second pivot unit 40 so that the first support unit 20 is tilted. The mobile phone 70 is magnetically fixed by the magnetic base 10 so that the user can watch the content played by the mobile phone 70.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A foldable magnetic stand device, comprising:

a magnetic base including a magnetic area and a supporting base located on opposite sides of the magnetic base, the magnetic base further including a magnet at the magnetic area and located inside the magnetic base, the magnetic base for fixing a mobile phone by magnetic attraction;

a first support unit coupled to the magnetic base;

a first pivot unit coupled to the first support unit providing a first axis of rotation for the magnetic base;

a second pivot unit coupled to the first pivot unit, the second pivot unit providing a second axis of rotation, and the first pivot unit rotates about the second axis of rotation;

a second support unit pivotally connected to the second pivot unit, and an angle and orientation between the first support unit and the second support unit being adjustable through adjusting the first pivot unit and the second pivot unit; and a carrier base connecting the first support unit to an outer wall of the magnetic base, and the magnetic base rotatable at the carrier base; and a positioning bump disposed on the outer wall of the magnetic base, and the carrier base has a positioning groove at a position corresponding to the positioning bump, and relative positions of the first support unit and the magnetic base are fixed based on the positioning bump being located in the positioning groove.

2. The foldable magnetic stand device according to claim 1, wherein the magnetic base is provided with an accommodating groove for the magnet to be placed in, and is also provided with a covering sheet adhered to the magnetic base for sealing the accommodating groove, and an exposed flat area of the covering sheet is the magnetic area.

3. The foldable magnetic stand device according to claim 1, wherein the supporting base is surrounded by a ring-shaped wall to form an accommodating area, and the accommodating area accommodating a magnetic wireless charging head.

4. The foldable magnetic stand device according to claim 3, wherein the ring-shaped wall comprises a main body and an auxiliary wall with a height higher than the main body of the ring-shaped wall, and an inner wall of the auxiliary wall has raised strips.

5. A foldable magnetic stand device, comprising:

a magnetic base including a magnetic area and a supporting base located on opposite sides of the magnetic base, the magnetic base further including a magnet at the magnetic area and located inside the magnetic base, the magnetic base for fixing a mobile phone by magnetic attraction;

a first support unit coupled to the magnetic base;

a first pivot unit coupled to the first support unit providing a first axis of rotation for the magnetic base, the first pivot unit including a first extension member at a middle position of the first pivot unit;

a second pivot unit coupled to the first pivot unit, the second pivot unit providing a second axis of rotation, the second pivot including a second extension member at a middle position of the second pivot unit, the first extension member and the second extension member being butted with each other and able to rotate around the second axis of rotation;

a second support unit pivotally connected to the second pivot unit, and an angle and orientation between the first support unit and the second support unit being adjustable through adjusting the first pivot unit and the second pivot unit; and a carrier base connecting the first support unit to an outer wall of the magnetic base, and the magnetic base rotatable at the carrier base; and a positioning bump disposed on the outer wall of the magnetic base, and the carrier base has a positioning groove at a position corresponding to the positioning bump, and relative positions of the first support unit and the magnetic base are fixed based on the positioning bump being located in the positioning groove.

6. The foldable magnetic stand device according to claim 5, wherein the second support unit includes a clamping unit on a side of the second support unit away from the second pivot unit, the clamping unit comprises a fixed clamping member and a movable clamping member, the fixed clamping member is located on the side of the second support unit away from a pivot joint, the movable clamping member is L-shaped, the movable clamping member partially extends into the second support unit, and the movable clamping member moveable linearly away from the fixed clamping member.

7. The foldable magnetic stand device according to claim 6, wherein the clamping unit also includes an elastic body, the elastic body is located in the second support unit and contacts the movable clamping member, and the elastic body provides the movable clamping member and the fixed clamping member with a clamping force.

8. The foldable magnetic stand device according to claim 6, wherein the second support unit is further provided with a guiding groove and a pulling member, the pulling member is connected to the movable clamping member inside the second support unit through the guiding groove, and when the pulling member is pulled the movable clamping member will move synchronously.

9. The foldable magnetic stand device according to claim 5, wherein the magnetic base rotates in a direction perpendicular to the first support unit.

10. A method of manufacturing a foldable magnetic stand device, comprising:

providing a magnetic base including a magnetic area and a supporting base located on opposite sides of the magnetic base, the magnetic base further including a magnet at the magnetic area and located inside the magnetic base, the magnetic base for fixing a mobile phone by magnetic attraction;

coupling a first support unit to the magnetic base;

coupling a first pivot unit to the first support unit providing a first axis of rotation for the magnetic base;

coupling a second pivot unit to the first pivot unit, the second pivot unit providing a second axis of rotation, and the first pivot unit rotates about the second axis of rotation;

pivotally connecting a second support unit to the second pivot unit, and an angle and orientation between the first support unit and the second support unit being adjustable through adjusting the first pivot unit and the second pivot unit; and connecting the first support unit to an outer wall of the magnetic base with a carrier base, and the magnetic base rotatable at the carrier base; and disposing a positioning bump on the outer wall of the magnetic base, and the carrier base has a positioning groove at a position corresponding to the positioning bump, and relative positions of the first support unit and the magnetic base are fixed based on the positioning bump being located in the positioning groove.

11. The method according to claim 10, wherein providing the magnetic base includes providing the magnetic base with an accommodating groove for the magnet to be placed in, and providing the magnetic base with a covering sheet adhered to the magnetic base for sealing the accommodating groove, and an exposed flat area of the covering sheet is the magnetic area.

12. The method according to claim 10, wherein providing the magnetic base includes providing the magnetic base with the supporting base surrounded by a ring-shaped wall to form an accommodating area, and the accommodating area accommodating a magnetic wireless charging head.

13. The method according to claim 12, wherein providing the magnetic base includes providing the magnetic base with the ring-shaped wall comprising a main body and an auxiliary wall with a height higher than the main body of the ring-shaped wall, and an inner wall of the auxiliary wall has raised strips.

14. The method according to claim 10 wherein:

coupling the first pivot unit includes coupling the first pivot unit with a first extension member at a middle position of the first pivot unit; and coupling the second pivot unit includes coupling the second pivot with a second extension member at a middle position of the second pivot unit, the first extension member and the second extension member being butted with each other and able to rotate around the second axis of rotation.

15. The method according to claim 14, wherein pivotally connecting the second support unit includes providing a side of the second support unit away from the second pivot unit with a clamping unit, the clamping unit comprises a fixed clamping member and a movable clamping member, the fixed clamping member is located on the side of the second support unit away from a pivot joint, the movable clamping member is L-shaped, the movable clamping member partially extends into the second support unit, and the movable clamping member moveable linearly away from the fixed clamping member.

16. The method according to claim 15, wherein pivotally connecting the second support unit with the clamping unit also includes connecting an elastic body, the elastic body is located in the second support unit and contacts the movable clamping member, and the elastic body provides the movable clamping member and the fixed clamping member with a clamping force.

17. The method according to claim 15, wherein pivotally connecting the second support unit includes connecting the second support unit provided with a guiding groove and a pulling member, the pulling member is connected to the movable clamping member inside the second support unit through the guiding groove, and when the pulling member is pulled the movable clamping member will move synchronously.

18. The method according to claim 14, wherein providing the magnetic base includes providing the magnetic base rotating in a direction perpendicular to the first support unit.

\* \* \* \* \*